(12) United States Patent
Friedmann et al.

(10) Patent No.: US 6,435,994 B1
(45) Date of Patent: Aug. 20, 2002

(54) CONTINUOUSLY VARIABLE TRANSMISSION

(75) Inventors: Oswald Friedmann, Lichtenau-Ulm; Hartmut Faust, Bühl-Moos, both of (DE)

(73) Assignee: Luk Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/543,508

(22) Filed: Apr. 6, 2000

(30) Foreign Application Priority Data

Apr. 7, 1999 (DE) .......................... 199 15 563

(51) Int. Cl.⁷ .......................... B62J 13/00; F16H 63/00; F16H 7/08
(52) U.S. Cl. .................. 474/145; 474/145; 474/146; 474/18; 474/111
(58) Field of Search ................. 474/111, 144, 474/145, 146, 147, 140, 18, 28

(56) References Cited

U.S. PATENT DOCUMENTS

| | | | | |
|---|---|---|---|---|
| 952,647 A | * | 3/1910 | Sorensen | 474/145 |
| 1,194,133 A | * | 8/1916 | Brown | 474/147 |
| 3,136,169 A | * | 6/1964 | Karger et al. | 474/111 |
| 4,344,761 A | | 8/1982 | Steuer | |
| 4,471,851 A | * | 9/1984 | Kamiya et al. | 474/144 X |
| 4,553,509 A | * | 11/1985 | Mezger et al. | 474/111 X |
| 4,832,664 A | | 5/1989 | Groger et al. | 474/111 |
| 4,850,314 A | * | 7/1989 | Villa | 474/146 X |
| 4,864,708 A | * | 9/1989 | Hoffmann et al. | 474/144 X |
| 4,927,404 A | | 5/1990 | Rattunde | |
| 5,046,991 A | | 9/1991 | Friedmann | |
| 5,295,915 A | | 3/1994 | Friedmann | |
| 5,427,582 A | | 6/1995 | Iwao et al. | |
| 5,711,730 A | | 1/1998 | Friedman et al. | |
| 5,728,021 A | | 3/1998 | van Rooij et al. | |
| 6,086,496 A | * | 7/2000 | Mou | 474/111 X |

FOREIGN PATENT DOCUMENTS

| | | |
|---|---|---|
| DE | 26 43 528 A 1 | 4/1977 |
| DE | 26 43 528 B 2 | 7/1979 |
| DE | 40 36 683 A1 | 5/1991 |
| DE | 42 34 294 A1 | 4/1993 |
| DE | 43 30 696 C1 | 3/1995 |
| JP | 236842 | * 8/1992 |
| JP | 344089 | * 12/1999 |

* cited by examiner

Primary Examiner—David A. Bucci
Assistant Examiner—Marcus Charles
(74) Attorney, Agent, or Firm—Darby & Darby (57) ABSTRACT

A continuously variable transmission or an analogous torque transmitting system has two rotary members in the form of wheels, gears or pulleys (such as adjustable pulleys) which are rotatable about parallel axes. An endless flexible element in the form of a link chain, pintle chain or belt has arcuate portions trained over the rotary members and elongated reaches or stretches extending between the arcuate portions. At least one of the stretches is at least partially confined in but movable lengthwise relative to an elongated rail or another suitable guide which at least reduces lateral stray movements of the respective stretch. This reduces noise as well as the wear upon the endless flexible element and the rotary members.

39 Claims, 6 Drawing Sheets

CONTINUOUSLY VARIABLE TRANSMISSION

BACKGROUND OF THE INVENTION

The invention relates to transmissions, and more particularly to improvements in transmissions of the type wherein an endless flexible element (especially a chain) is trained over a plurality of rotary members in the form of pulleys or sheaves, wheels, gears or the like. Examples of transmissions of the type to which the present invention pertains are those known as infinitely or continuously variable transmissions (called CVTs) wherein an endless flexible belt, band or chain (herein-after called chain) is trained over adjustable pulleys or sheaves (hereinafter pulleys). Transmissions of such character are utilized in the power trains of numerous types of motor vehicles to transmit torque between a prime mover (such as an internal combustion engine or a hybrid employing a motor and an engine) and the axles of front and/or rear wheels, e.g., by way of a differential.

Continuously variable transmissions of the type to which the present invention pertains and which can be utilized in the power train of a motor vehicle are disclosed, for example, in German patent No. 42 34 294. Endless chains which can be utilized in such transmissions are disclosed in German patents Nos. 43 30 696 (this publication discloses a chain which is designed to transmit tractive or tensile force) and 26 43 528 (this publication describes endless chains designed for the transmission of thrust).

A continuously or infinitely variable transmission (hereinafter called transmission for short) of the type to which the present invention pertains is likely or bound to generate noise when in actual use. Such undesirable side effect is attributable primarily to at least one of the elongated portions (known as stretches or reaches) of an endless flexible chain which is trained over at least two rotary members. For example, a CVT normally employs first and second adjustable rotary pulleys which are rotatable about parallel axes. The chain is or can be a so-called link chain or pintle chain and includes a first arcuate portion having a variable radius of curvature and being trained over a first pulley, a second arcuate portion having a variable radius of curvature and being trained over a second pulley, a first elongated (e.g., substantially or exactly straight) reach or stretch extending between the two arcuate chain portions from one of the first and second pulleys to the other of these pulleys, and a second elongated reach or stretch extending between the two arcuate portions from the other to the one arcuate portion. The first stretch is acted upon by a pulling force when the second stretch is pushed, or vice versa, depending upon which of the pulleys is driven to transmit torque to the other pulley.

Noise is generated by at least one of the stretches of the chain as a result of transverse vibrations. Such vibrations are undesirable for numerous reasons. For example, if the vibrations are conveyed or communicated to the chassis of the motor vehicle, this can result in the generation of often readily detectable noise which is unpleasant to the driver as well as to other occupant(s) of the vehicle. Furthermore, vibrations cause extensive wear, e.g., upon the links and/or pintles and/or other constituents of the chain, i.e., they can unduly affect the useful life of the chain and of the entire transmission.

The disclosure of each U.S. and foreign patent and patent application identified in the specification of the present application is incorporated herein by reference. This also includes each priority application being relied upon by the present application.

OBJECTS OF THE INVENTION

An object of the present invention is to provide a transmission wherein an endless flexible element (such as a chain) is less likely to generate noise and/or to cause pronounced or excessive wear than the endless flexible elements in presently known continuously variable transmissions.

Another object of the invention is to provide a continuously variable transmission wherein the likelihood of noise generation is reduced in a simple, inexpensive and space-saving manner.

A further object of the invention is to provide a continuously variable transmission which exhibits the just outlined features, advantages and attributes and can be incorporated into the power trains of motor vehicles in a simple and time-saving manner.

An additional object of the invention is to provide a novel and improved chain and chain guide combination which can be incorporated into a continuously variable transmission of the above outlined character.

Still another object of the invention is to provide a power train which embodies a novel and improved continuously variable transmission or an analogous transmission.

A further object of the invention is to provide a novel and improved method of reducing the likelihood of noise generation by the chain or another endless flexible element of a transmission, such as a transmission wherein an endless flexible element is trained over at least two pulleys, gears, wheels or analogous rotary torque transmitting and/or torque receiving members.

Another object of the invention is to provide a transmission which is designed to generate less noise than conventional transmissions irrespective of whether one of the rotary members transmits torque to the other rotary member(s) or vice versa.

An additional object of the invention is to provide a novel and improved infinitely variable transmission of the type known as CVT, and to construct and assemble the transmission in such a way that it can be installed in existing power trains of or for motor vehicles as a superior substitute for existing transmissions of such character without necessitating any, or any appreciable, alterations under the hood of the motor vehicle.

Still another object of the invention is to provide a continuously variable or an analogous transmission the parts of which can be mass produced in available machines or production lines.

A further object of the invention is to provide a novel and improved guide for an endless flexible element which can be utilized in a transmission of the above outlined character.

Another object of the invention is to provide novel and improved means for supporting the guide in a continuously variable transmission or in the housing or casing of such transmission.

SUMMARY OF THE INVENTION

The invention is embodied in a transmission, such as a continuously variable transmission, which comprises a first rotary member (e.g., a first adjustable pulley wherein a first conical flange is movable axially toward and away from a second conical flange), a second rotary member (e.g., a second adjustable pulley similar to or identical with the first pulley and rotatable about an axis which is parallel to the axis of the first rotary member), and and endless flexible torque transmitting element (hereinafter called chain for short) having first and second arcuate portions respectively trained over the first and second rotary members, and first and second elongated stretches or reaches each of which extends between the first and second arcuate portions. In accordance with a feature of the present invention, the transmission further comprises an elongated guide for at least one stretch of the chain.

If the rotary members are adjustable pulleys, each thereof can be designed in such a way that one of its conical flanges is movable axially toward and away from but cannot rotate relative to the other conical flange. The arcuate portions of the chain contact the conical surfaces of the flanges forming part of the respective pulleys.

The guide can be provided with means for limiting the at least one stretch of the chain to movements along one or more paths of a plurality of predetermined paths each of which extends between the first and second portions of the chain. The exact path of the at least one stretch can vary continuously during adjustment of the rotary members if such rotary members constitute adjustable pulleys wherein one of the flanges is movable axially toward or away from the other flange.

The limiting means of the guide can define a short or an elongated channel adapted to receive a relatively short or a longer part of the at least one stretch of the chain.

The improved transmission can further comprise a holder or support and means for preferably movably mounting the guide on the suport. The mounting means can define a pivot axis for the guide, and such pivot axis is or can be parallel to the axes of the rotary members. Alternatively, or in addition to defining for the guide a pivot axis, the mounting means can be arranged to establish at least one path for lengthwise movements of the guide along such path.

The rotary members of the transmission are or can be spaced apart from each other, and the guide can be disposed or supported in the space between such rotary members.

It is also possible to provide the guide with at least one frame or to utilize a guide which constitutes a frame at least partially surrounding the at least one stretch of the chain.

It is also possible to utilize a composite guide or a one-piece guide having at least one portion exhibiting an at least substantially U-shaped outline and defining a channel which receives at least a portion of the at least one stretch of the chain.

Even though the guide at least partially surrounds (or can at least partially surround) the at least one stretch of the chain, such at least one stretch is or can be mounted with freedom of movement of the at least one stretch substantially radially of the parallel axes of the rotary members or at least substantially radially of the axis of at least one rotary member.

The guide can be provided with one or more projections in the form of strips, prongs, pins, tongues or the like. Each such projection can extend, at least in part, lengthwise of the at least one stretch of the chain.

In accordance with one presently preferred embodiment, the guide includes a central portion (such as a tunnel) which at least partially surrounds a median portion of the at least one stretch of the chain, and first and second projections which flank the central portion of the guide and respectively extend at least substantially lengthwise of the at least one stretch toward the first and second rotary members, i.e., toward the arcuate first and second portions of the chain.

The guide can include at least two projections which are disposed at opposite sides and extend at least substantially lengthwise of the at least one stretch; one of such at least two projections can be disposed at the inner side of the at least one stretch (i.e., the side which faces toward the axes of the rotary members), and the other projection can be disposed at the outer side of the at least one stretch.

The inner side of the at least one stretch of the chain confronts the normally parallel axes of the two rotary members, and the guide can include at least one projection which extends lengthwise of the at least one stretch at the inner or at the outer side of the at least one stretch.

The guide can be made of a single piece of a suitable metallic or plastic material or a combination of two or more different materials. Alternatively, the guide can comprise a plurality of discrete sections and means for securing such sections to each other. For example, the guide can be made of a plurality of shell-shaped or trough-shaped or otherwise configured sections (such as two sections which are mirror images of each other), and the means for securing the plural sections to each other can comprise one or more threaded fasteners and/or other suitable fastener means. For example, in addition to or in lieu of being secured to each other by one or more threaded and/or other fasteners, the sections can be bonded (such as glued or soldered or welded) to each other.

If the guide comprises at least two sections, it is also possible to employ securing means which comprises at least one male coupling element provided on one of the sections and at least one complementary female coupling element provided on the other section. For example, the at least one male coupling element can comprise a hook, and the complementary female coupling element can be provided with an opening for such hook.

Furthermore, and if the guide comprises at least two sections which can be assembled prior to receiving the at least one stretch of the chain or subsequent to placing of the sections around the at least one stretch, the guide can be provided with means for centering at least one of the sections relative to the other section or sections.

The support for the guide can be installed at that side of the at least one stretch of the chain which faces toward the axes of the rotary members. This ensures that neither the support nor the means for securing the guide to the support need take up space externally of the chain. The securing means can include at least one cylindrical member, e.g., a member constituting a tube and having a cylindrical external surface. Such tubular member can serve the additional purpose of conveying at least one flow of a suitable hydraulic fluid (such as oil or another lubricant) from a source to one or more locales of actual use, such as the hubs of the flanges forming part of the aforesaid adjustable rotary pulleys.

The holder or support for the at least one stretch can be stationary and, as already mentioned above, can be installed at that side of the at least one stretch which faces toward the axes of the rotary members.

The guide can share at least some of the linear and/or angular movements of the at least one stretch of the chain relative to the two rotary members.

The guide can be installed and dimensioned in such a way that one of its sections (such as the central or median section) surrounds the corresponding portion of the at least one stretch with a first amount of play, and that at least one of the end portions of such guide surrounds the corresponding portion(s) of the at least one stretch with a second play different from (e.g., larger than) the first play.

The guide can include or carry at least one resilient part (e.g., one or more suitable springs such as coil springs or leaf springs or the like) which is installed in stressed condition so that it can bias the adjacent portion or portions of the guide in a desired direction, e.g., against the adjacent portion of the at least one stretch of the chain.

It is further within the purview of the invention to provide one or more metallic or other plastic plates, rails and/or other types of means for reinforcing at least a portion of the guide, e.g., at least that portion of the guide which is likely to undergo extensive wear as a result of repeated (such as continuous) contact with portions (such as links and/or pintles) of the endless chain.

If the support for the guide and/or at least a portion of the guide consits (at least in part) of a plastic material, such material can be, for example, a thermosetting or a thermoplastic material. For example, the plastic material can be selected from epoxy resins, polyamide, polyethylene, polypropylene, polyvinyl chloride, polyether ketone, polyester ether ketone, polybutylene therephthalate, polycarbonate, polystyrene, polyurethane, polypropylene sulfide, polyether sulphone, polyoxymethylene, styrene and copolymerisates of the above enumerated substances.

Still further, at least a portion of the guide can consist of a reinforced plastic material, e.g., a plastic material which is reinforced with glass fibers, carbon filaments and/or in any other suitable way.

The cost of the guide can be reduced, at least slightly, by assembling the guide of two sections which are mirror images of each other and which are thereupon bonded and/or otherwise (such as mechanically) fastened to each other.

It is further possible to provide the transmission with two discrete guides, one for each of the two elongated stretches or reaches which connect the two arcuate portions of the chain to each other.

Last but not least, it is equally possible to associate the at least one elongated stretch or reach of the chain with a plurality of discrete guides each of which guides (with requisite clearance) a discrete portion of the respective stretch.

The novel features which are considered as characteristic of the invention are set forth in particular in the appended claims. The improved transmission itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 4b is a plan view of the structure which is shown in FIG. 4a;

DESCRIPTION OF PREFERRED EMBODIMENTS

Figure 1:
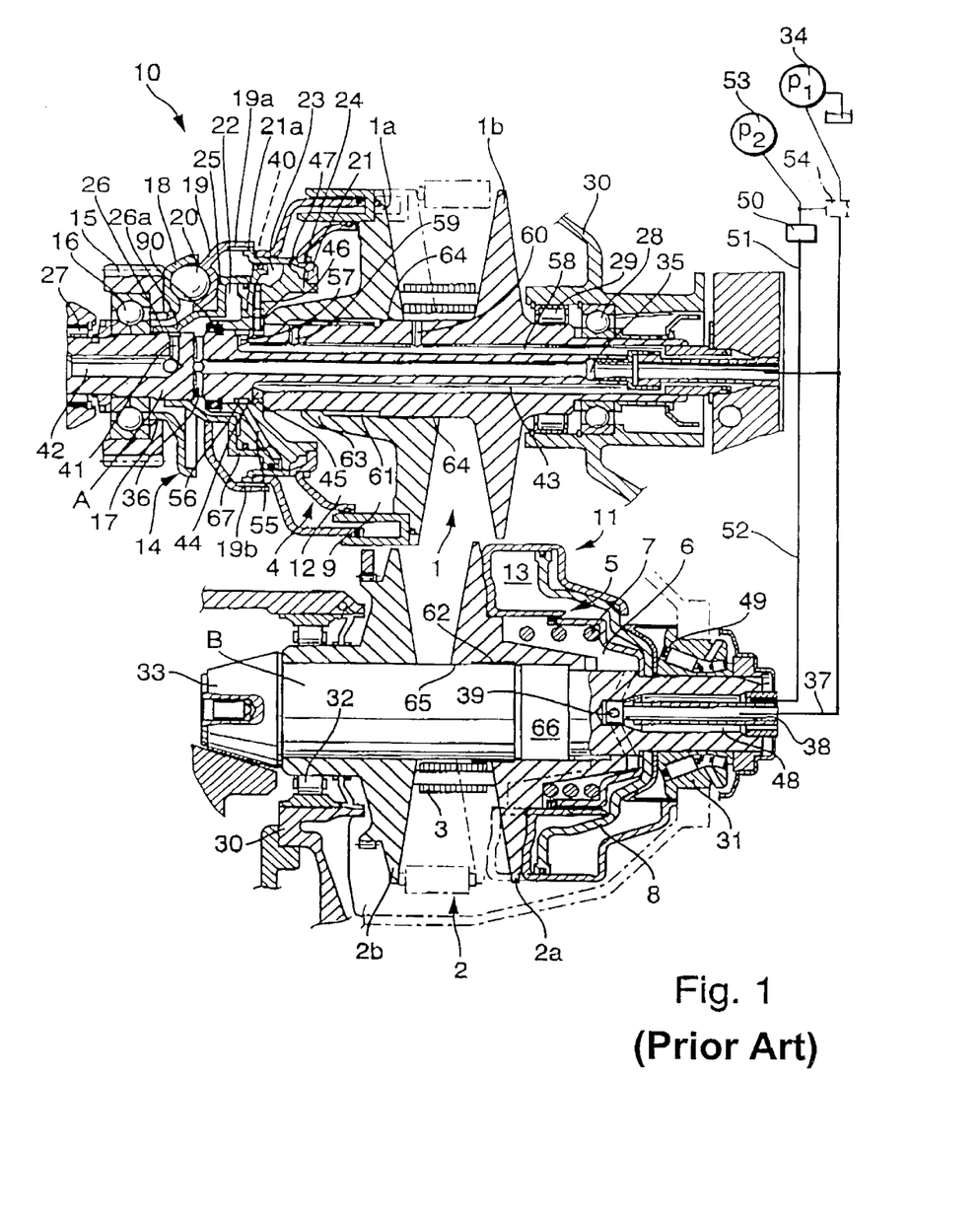
FIG. 1 is a fragmentary partly schematic and partly axial sectional view of a continuously variable transmission of the type wherein the endless flexible element can be associated with a guide embodying the present invention, the arcuate portions of the endless flexible element being shown in several positions, partly by solid lines and partly by dot-dash lines.

FIG. 1 shows certain relevant features of a power train of the type shown in FIGS. 1 and 1a of commonly owned U.S. Pat. No. 5,711,730 granted Jan. 27, 1998 to Oswald Friedmann et al. for "TORQUE MONITORING APPARATUS". The patented power train can employ an infinitely variable transmission (such as a continuously variable transmission known as CVT) wherein an endless flexible. torque transmitting element (such as a link chain or pintle chain) can be utilized jointly with a guide which is designed and incorporated into the transmission in accordance with the present invention.

Referring now to FIG. 1 in detail, there is shown an infinitely variable transmission including a first rotary member 1 constituting an adjustable sheave or pulley, a second rotary member 2 also constituting an adjustable sheave or pulley, and an endless flexible element 3 (e.g., a chain). The flexible element 3 (herein-after called chain for short) includes first and second arcuate portions which are respectively trained over the pulleys 1 and 2, a first elongated reach or stretch which extends from the pulley 1 to the pulley 2, and a second elongated reach or stretch which extends from the pulley 2 to the pulley 1.

The pulley 1 is non-rotatably carried by a rotary input member A here shown as a shaft which is parallel to a rotary output member B including or constituting a shaft which supports and is non-rotatably connected with the pulley 2. The pulleys 1 and 2 respectively comprise axially movable first flanges 1a, 2a and axially fixed second flanges 1b, 2b. The flanges 1a, 1b have confronting conical surfaces which are contacted by the respective arcuate portion of the chain 3, and the flanges 2a, 2b are also provided with confronting conical surfaces which are contacted by the respective arcuate portion of the chain 3.

The flange 1a is located at a maximum axial distance from the flange 1b (this is shown by solid lines in the upper part of the pulley 1), and the flange 2a is located at a minimum axial distance from the flange 2b (this is shown by solid lines in the upper part of the pulley 2) when the ratio of the transmission including the pulleys 1, 2 and the chain 3 assumes a maximum value. The transmission then constitutes or acts as an underdrive wherein the RPM of the shaft A can greatly exceed the RPM of the shaft B. On the other hand, if the axially movable flange 1a is caused to move to a position at a minimum axial distance from the axially fixed flange 1b (as shown by solid lines in the lower half of the pulley 1), the flange 2a is located at a maximum axial distance from the flange 2b (this is shown in the lower half of the pulley 2) and the transmission constitutes or acts as an overdrive because the RPM of the pulley 2 and shaft B exceeds the RPM of the pulley 1 and shaft A by a maximum value.

The means for adjusting the pulley 1 (i.e., for moving the flange 1a axially and relative to the flange 1b) comprises a preferably hydraulically operated cylinder and piston unit 4, and the means for adjusting the pulley 2 (by moving the flange 2a axially and relative to the flange 2b) comprises a preferably hydraulically operated cylinder and piston unit 5. The chamber 6 of the adjusting unit 5 comprises at least one energy storin element here shown as a coil spring 7 which biases the axially movable flange 2a in a direction toward the axially fixed flange 2b. The bias of the coil spring 7 increases in response to movement of the flange 2a axially and away from the flange 2b, i.e., when that (looped) portion of the chain 3 which is trained over the pulley 2 is permitted or caused to assume a position at a minimum distance from the common axis of the shaft B and pulley 2. Otherwise stated, the bias of the spring 7 increases in response to a rise of the ratio of the transmission in a sense to increase the RPM of the shaft B relative to the RPM of the shaft A. The coil spring 7 reacts against a cupped member 8 which is rigidly secured to the shaft B, and this spring bears (or can bear) directly upon the axially movable flange 2a of the pulley 2.

The adjusting unit 4 operates in parallel with an adjusting unit 10, and the adjusting unit 5 operates in parallel with an adjusting unit 11. Each of the units 10, 11 preferably also constitutes a hydraulically operated cylinder and piston unit or assembly. The purpose of the adjusting units 10, 11 is to vary the ratio of the transmission including the pulleys 1, 2 and the chain 3. The adjusting unit 10 has a cylinder chamber 12, and the adjusting unit 11 has a cylinder chamber 13. The ratio of the transmission is changed in response to admission of pressurized fluid into and in response to evacuation of such fluid from the chambers 12 and 13. To this end, the chambers 12, 13 can be connected to a source of pressurized hydraulic fluid (such as a pump) or with one or more fluid evacuating channels, conduits and/or other suitable passages.

If the ratio of the transmission is to be changed, one of the chambers 12, 13 receives pressurized fluid to increase its volume whereas the contents of the other of these chambers are evacuated, at least in part, to reduce its volume. The means for regulating the admission of fluid into and the evacuation of fluid from the cylinder chambers 12, 13 includes one or more suitable valves. Suitable valves are disclosed in the prior art which is incorporated by reference into the disclosure of the present application. For example, the published German patent application Serial No. 40 36 683 shows, in FIG. 2, a so-called square slide gate or valve 36 which can regulate the flow of fluid furnished by a source in the form of a pump 14. A similar or identical valve can be used in the infinitely variable transmission of FIG. 1 to regulate the flow of fluid into and from the cylinder chambers 12 and 13.

The power train which is shown in FIG. 1 further comprises a hydromechanical torque monitoring device or sensor 14 serving to generate or establish a pressure which depends at least upon the magnitude of transmitted torque. In the embodiment which is shown in FIG. 1, the torque sensor 14 is constructed, assembled and installed to transit torque from a driver gear or pinion 15 to the first pulley 1 of the infinitely variable transmission. The driver pinion is mounted on an antifriction bearing 16 which surrounds the input shaft A. This driver pinion can transmit torque to a rotary cam disc 18 of the torque sensor 14 by way of a form-locking connection 17, e.g., a set of mating gears. The cam disc 18 is held in an axially fixed position by the driver pinion 15 and cooperates with an axially movable second cam disc 19 of the torque sensor 14. The cam discs 18, 19 have confronting surfaces (e.g., in the form of ramps) which abut one or more spherical spreading elements 20 between the discs 18, 19. The cam disc 19 is free to move axially of but cannot rotate relative to the input shaft A. To this end, the cam disc 19 comprises a radially outer portion 19a which extends axially of the shaft A and away from the spreading elements 20 and includes a gear 19b in mesh with a complementary gear 21a on a member 21 which is mounted on and cannot rotate and/or move axially relative to the shaft A. However, the gears 19b, 21a permit axial movements of the cam disc 19 relative to the member 21 and shaft A.

The component parts of the torque sensor 14 define two plenum chambers 22 and 23. Such component parts can be said to constitute or resemble walls including a ring-shaped member 24 and members 25, 26 which are carried by or form part of the cam disc 19. The members 24, 25 and 26 define the plenum chamber 22. The member 24 is rigidly secured to the shaft A and the members 25, 26 are shown as separately produced parts. The plenum chamber 23 extends radially outwardly beyond and is axially offset relative to the plenum chamber 22. This second plenum chamber 23 is bounded in part by the ring-shaped member 24, by the (substantially or partly sleeve-like) member 21 which is fixedly connected to the member 24, and by the ring-shaped member 25 which, as already stated above, forms part of or is affixed to the cam disc 19. The latter is movable axially of the shaft A and performs the function of a piston.

The input shaft A is mounted in a housing 30 by way of a needle bearing 27 which is disposed at the left-hand side of the torque sensor 14 (as viewed in FIG. 1) and by way of a thrust roller bearing 28 and a radial roller bearing 29 disposed at the other side of the adjustable pulley 1 (as viewed in FIG. 1). The output shaft B is also mounted in the housing 30, namely in a twin antifriction roller bearing 31 at the right-hand sides of the adjusting units 5 and 11 for the axially movable flange 2a of the pulley 2 on the shaft B, and an antifriction roller bearing 32 to the left of the pulley 2, all as viewed in FIG. 1. The twin antifriction bearing 31 is designed to take up radial stresses as well as two-directional axial stresses. The left-hand axial end of the driven shaft B is provided with a bevel gear 33 which can be moved into mesh with a complementary gear in the differential of the power train of a motor vehicle or with a complementary gear which is operatively connected with the differential.

In order to generate a pressure which is modulated at least in dependency upon the magnitude of transmitted torque and which is necessary in order to effect appropriate frictional clamping engagement between the flanges of the pulleys 1, 2 and the chain 3 forming part of the infinitely variable transmission, the torque sensor 14 is operatively connected with a source of pressurized hydraulic fluid here shown as a pump 34. The outlet of the pump 34 is connected with the plenum chamber 22 of the torque sensor 14 by a centrally located axially extending channel 35 and at least one radially extending channel 36, both provided in the driving shaft A. The outlet of the pump 34 is further connected with the cylinder chamber 6 of the hydraulic cylinder and piston assembly which constitutes the adjusting unit 5 for the axially movable flange 2a of the pulley 2. The connection includes a conduit 37, a centrally located axially extending channel 38 in the driven shaft B, and one or more substantially radially extending channels 39 also provided in the shaft B.

The plenum chamber 22 of the torque sensor 14 is connected with the cylinder chamber 9 of the cylinder and piston assembly constituting the adjusting unit 4 for the axially movable flange 1a of the pulley 1 by a channel 40 which is not located in the plane of FIG. 1 and, therefore, is indicated by broken lines. This channel 40 is provided in the ring-shaped member 24 which is affixed to or is of one piece with the driving shaft A. The channel 40 further establishes permanent communication between the plenum chamber 22 of the torque sensor 14 and the cylinder chamber 9 of the adjusting unit 4 for the flange 1a of the pulley 1.

The driving shaft A is further provided with at least one channel 41 constituting an outlet for the flow of hydraulic fluid from the plenum chamber 22 of the torque sensor 14. The illustrated channel 41 communicates with or can be caused to communicate with the plenum chamber 22 at least in dependency upon the magnitude of transmitted torque. As shown in FIG. 1, the illustrated channel 41 extends at least substantially radialy and communicates with a second centrally located axially extending channel 42 of the driving shaft. The channel 42 can be used as a means for conveying hydraulic fluid from the plenum chamber 22 to one or more component parts (e.g., to one or more friction clutches or brakes) forming part of the power train including the torque sensor 14 and the transmission including the pulleys 1, 2 and the chain 3. For example, the fluid leaving the plenum chamber 22 via channels 41, 42 can be used as a lubricant and/or as a coolant, also for the component parts of the transmission including the pulleys 1, 2 and the chain 3.

The means for regulating the rate of flow of hydraulic fluid from the plenum chamber 22 by way of the channel or channels 41 (hereinafter referred to as channel or outlet) includes a radially inner portion 26a of the cam disc 19 (which latter is axially movable relative to the driving shaft A). The arrangement is such that the axial position of the cam disc 19 changes in response to changes in the magnitude of transmitted torque whereby the portion 26a of the disc 19 moves axially of the shaft A to throttle or to permit the flow of fluid from the plenum chamber 22 at least in dependency upon the magnitude of such torque. It can be said that the portion 26a of the cam disc 19 and that portion of the driving shaft A which defines the channel or outlet 41 constitute a valve, and more particularly a throttle valve or flow restrictor for hydraulic fluid leaving the plenum chamber 22 on its way toward one or more component parts which require cooling and/or lubrication.

The cam disc 19 acts not unlike a piston which moves axially of the driving shaft A at least in dependency upon the torque which is being transmitted between the cam discs 18 and 19 and thus effects an increase or a reduction of the rate of fluid flow from the plenum chamber 22 via outlet 41; this results in the establishment, at least in the plenum chamber 22, of a pressure of fluid (supplied by the pump 34) which is indicative at least of the magnitude of transmitted torque. Since the plenum chamber 22 is communicatively connected with the cylinder chamber 9 and with the cylinder chamber 6 (by way of the passages 35, 36, 37, 38 and 39), the fluid pressure in the chambers 6 and 9 is also indicative of the magnitude of transmitted torque.

Since the adjusting units 4 and 5 are connected in parallel with the respective adjusting units 10 and 11, the fluid pressure which is supplied for displacement of the axially movable flanges 1a, 2a of the pulleys 1, 2 generates forces which are added to the forces generated as a result of fluid pressure in the cylinder chambers 12 and 13 for the purposes of selecting a desired transmission ratio.

The cylinder chamber 12 of the adjusting unit 10 for the axially movable flange 1a of the pulley 1 receives pressurized hydraulic fluid from a discrete source 53 (e.g., a gear pump or a vane pump) by way of an axially parallel channel 43 which is provided in the driving shaft A, at least one substantially radially extending bore 44 which is also provided in the shaft A and communicates with the channel 43, a circumferentially extending (preferably circumferentially complete) peripheral groove 45 provided in the shaft A and communicating with the at least one bore 44, at least one channel 46 which is provided in the ring-shaped member 24 and communicates with the groove 45, and a substantially radially extending passage 47 provided in the sleeve-like member 21 and communicating with the cylinder chamber 12.

The connection between the pump 53 and the cylinder chamber 13 of the adjusting unit 11 for the axially movable flange 2a of the pulley 2 comprises a ring-shaped channel 48 which is provided in the driven shaft B and surrounds the centrally located channel 38, and at least one substantially radially extending channel or bore 49 also provided in the shaft B and connecting the channel 48 with the chamber 13. A conduit 51 connects the outlet of the pump 53 with the channel 43, and a conduit 52 connects the outlet of the pump 53 with the channel 48. A valve, or a system 50 of valves, controls the flow of pressurized fluid from the pump 53, via conduits 51, 52, and into the channels 43, 48 of the shafts A and B, respectively.

The pump 53 constitutes an optional component part of the power train. If this pump is omitted, the power train comprises a valve 54 (shown in FIG. 1 by broken lines) or a system of valves serving to regulate the flow of pressurized hydraulic fluid from the pump 34 to the conduits 51 and 52. The valve 54 (which can comprise one or more discrete valves) serves to regulate the volumetric flow and/or the pressure of fluid flowing from the pump 34 into the conduits 51 and 52.

The second plenum chamber 23 of the torque sensor 14 is connected in parallel with the first plenum chamber 22, at least when the fluid in the chamber 23 is maintained under pressure. The plenum chamber 23 is sealed from the pump 34 when the transmission including the pulleys 1, 2 and the chain 3 operates in such a way that the rotational speed of the pulley 2 assumes its lowermost value because the axially movable flanges 1a, 2a then assume the axial positions which are shown in the upper portions of the respective pulleys. The reason is that, at such time, the composite path defined by the channels, bores and/or analogous passages 55 through 60 does not permit hydraulic fluid to flow from the pump 34 (or from an equivalent source of pressurized hydraulic fluid) to the plenum chamber 23. The axial position of the flange 1a is then such as shown in the upper portion of the pulley 1 of FIG. 1, i.e., the radially outer portion of the bore 60 in the driving shaft A is fully exposed so that the pressure of fluid in the plenum chamber 23 need not exceed atmospheric pressure. The axial force which the torque sensor 14 then transmits for the purposes of torque transmission and which is being applied to the cam discs, namely to the cam disc 19, is taken up only by the cushion of pressurized hydraulic fluid in the plenum chamber 22. The fluid pressure in the plenum chamber 22 is higher if the torque to be transmitted by the torque sensor 14 increases. As mentioned hereinbefore, such pressure is regulated by the throttle valve including the portion 26a of the part 26 of the cam disc 19 and that portion of the driving shaft A which defines the outlet of the channel 41.

If the ratio of the transmission is to be increased, the flange 1a of the pulley 1 is moved axially of the driving shaft A in a direction toward the axially fixed flange 1b, and the flange 2a of the pulley 2 is moved axially of the driven shaft B and away from the axially fixed flange 2b. As already explained above, this results in a movement of the flange 1a toward or all the way to the position shown in the lower half of the pulley 1 (as viewed in FIG. 1) and in a movement of the flange 2a toward or all the way to the position shown in the lower half of the pulley 2. Axial movements of the flanges 1a, 2a from the positions shown in the upper halves of the pulleys 1, 2 (as viewed in FIG. 1) toward the positions shown in the lower halves of the respective pulleys (i.e., to increase the ratio of the infinitely variable transmission) are initiated by the valve 50 which is actuated to permit pressurized hydraulic fluid to flow from the pump 53 (or from the pump 34 via system 54 of valves if the pump 53 is omitted) into the cylinder chamber 12 of the adjusting unit 10 while, at the same time, fluid is free to flow from the cylinder chamber 13 of the adjusting unit 11. In other words, the volume of fluid in the chamber 12 increases and the volume of fluid in the chamber 13 decreases.

The connections which enable the flanges 1a, 2a to move axially of but prevent these flanges from turning relative to the respective shafts A, B include toothed couplings 61 and 62.

That axial position of the flange 1a in which the ratio of the infinitely variable transmission assumes a maximum value is shown by solid lines in the lower half and by phantom lines in the upper half of the pulley 1 (as viewed in FIG. 1). The corresponding position of the upper portion of the chain 3 is shown by phantom lines in the upper half of the pulley 1, again as viewed in FIG. 1. The flange 2a assumes the axial position which is shown by phantom lines in the lower half and by solid lines in the upper half of the pulley 2 (as viewed in FIG. 1) when the ratio of the transmission is set at a minimum value.

The axially movable flange 1a of the pulley 1 includes axially spaced apart centering portions 63, 64 which cooperate with the adjacent portions of the periphery of the driving shaft A, and the axially movable flange 2a of the pulley 2 comprises axially spaced apart centering portions 65, 66 which cooperate with the adjacent portions of the periphery of the driven shaft B. The arrangement is preferably such that the flanges 1a, 2a are movable axially of the respective shafts A and B without any, or without any appreciable, radial play. The centering portions 63, 64 of the flange la cooperate with those portions of the shaft A which define the adjacent radially outer ends of the channels or bores 59, 60 to form therewith a pair of valves. The flange 1a constitutes the axially movable valving element of each of these valves. If the flange 1a is caused to leave the solid-line position shown in the upper half of the pulley 1 and to move in a direction to the right, as viewed in FIG. 1, it gradually overlies the radially outer end of the bore 60 to thus progressively throttle the flow of hydraulic fluid through such bore. When the flange 1a reaches an axial position in which its centering portion 64 seals the radially outer end of the bore 60, the other centering portion 63 seals the radially outer end of the bore or channel 59. If the flange 1a is caused to continue its axial movement toward the axially fixed flange 1b, the centering portion 64 continues to seal the radially outer end of the bore 60 but the centering portion 63 advances beyond and exposes the radially outer end of the bore 59. This establishes a gradually increasing connection for the flow of hydraulic fluid between the cylinder chamber 9 of the adjusting unit 4 and the channel 58 of the shaft A which, in turn, establishes a path for the flow of hydraulic fluid to the plenum chamber 23 through the passages 55, 56 and 57. At such time, the radially outer end of the bore 60 is at least substantially sealed (by the centering portion 64) while the plenum chambers 22, 23 are free to communicate with the cylinder chamber 9. Consequently, the pressure of hydraulic fluid in the plenum chambers 22, 23 matches the fluid pressure in the cylinder chamber 9 and also in the cylinder chamber 6 which is communicatively connected with the pump 34 by the channel 35, by the conduit 37 and by channel 38. The difference, if any, between the fluid pressures in the plenum chambers 22, 23 and cylinder chamber 9 on the one hand and the cylinder chamber 6 on the other hand is attributable to losses due to friction between the fluid and the surfaces surrounding the respective path or paths.

Owing to the establishment of a transmission ratio-dependent connection between the plenum chambers 22 and 23, the axially effective surface of the pressurized fluid cushion which develops in the torque sensor 14 is increased because the axially effective surfaces in the two plenum chambers 22, 23 are added to, i.e., superimposed upon, each other. Such increase of the overall dimensons of the axially effective supporting surface ensures that, if the magnitude of the torque remains unchanged, the pressure which is being built up by the torque sensor 14 is reduced at least substantially proportionally to the increase of the effective surface. This, in turn, means that the pressure of hydraulic fluid in the cylinder chambers 9 and 6 is reduced accordingly. Thus, the torque sensor 14 can be resorted to for transmission ratio-dependent modulation of fluid pressure in superimposition upon that pressure modulation which is dependent upon the magnitude of transmitted torque. Otherwise stated, the torque sensor 14 permits or renders possible a practically two-stage modulation of the pressure or pressure level.

In the power train which is shown in FIG. 1, the mutual positions of the bores 59, 60 as well as their positions relative to the centering portions 63, 64 of the axially movable flange 1a are selected in such a way that the switching over from the establishment of fluid pressure only in the plenum chamber 22 to the establishment of fluid pressure in the plenum chambers 22, 23 or vice versa takes place when the ratio of the infinitely variable transmission including the pulleys 1, 2 and the chain 3 is or approximates one-to-one. It is advisable to ensure that the shift from the plenum chamber 22 to the combination of plenum chambers 22, 23 or vice versa take place gradually rather than abruptly (for example or particularly for structural or constructional reasons). In other words, it is desirable to establish a transition stage during which the bore 60 is already sealed by the axially movable flange 1a while the bore 59 is still sealed from the cylinder chamber 9 of the adjusting unit 4. In order to ensure satisfactory operation of the torque sensor 14 and/or of the infinitely variable transmission during such transitional stage, the cam disc 19 of the torque sensor 14 must be mounted with freedom of movability in the axial direction of the driving shaft A and the torque sensor comprises means for facilitating a change of the effective volume of the plenum chamber 23. This enables the torque sensor 14 to act not unlike a pump in that its component parts which can be said to constitute a piston and a cylinder are movable relative to each other. In the power train of FIG. 1, such (compensating) means for facilitating a change of the effective volume of the plenum chamber 23 is a so-called tongue- or lip seal 67 which is installed in a circumferentially extending annular recess or groove of the ring-shaped member 24 and contacts the adjacent cylindrical internal surface of the piston-like member 25. In other words, the part 67 can seal the plenum chambers 22, 23 from each other.

The illustrated lip seal 67 is installed and designed in such a way that it can act as a one-way valve or check valve which permits fluid to flow from the plenum chamber 22 into the plenum chamber 23 but prevents the fluid from flowing in the opposite direction. In other words, if the fluid pressure in the chamber 23 exceeds that in the plenum chamber 22, the seal or valve 67 permits an equalization of fluid pressures in the chambers 22 and 23. When the cam disc 19 is caused to move in a direction to the right, as viewed in FIG. 1, and when the plenum chamber 23 is otherwise sealed, fluid can flow from the plenum chamber 23 into the plenum chamber 22. If the cam disc 19 is thereupon caused to move axially in a direction to the left, again as viewed in FIG. 1, the pressure in the plenum chamber 23 can decrease (and the fluid, such as oil, can even contain bubbles of air or another gas) without adversely affecting the mode of operation of the torque sensor 14 and/or of the infinitely variable transmission including the pulleys 1, 2, the chain 3 and the adjusting units 4, 5 and 10.

The lip seal 67 can be replaced by, or even utilized in conjunction with, a check valve or a one-way valve of standard or any other suitable design. If a standard check valve is utilized in the power train of FIG. 1, it can be mounted in or on the ring-shaped member 24. In such instance, the illustrated lip seal 67 is or can be replaced with a seal which is effective at all times, i.e., which prevents hydraulic fluid from flowing between the plenum chambers 22, 23 in either direction. Still furter, a check valve performing the function of the lip seal 67 can be installed between the channels 35 and 58. All that counts is to ensure that the selected check valve or valves permits or permit pressurized hydraulic fluid to flow from the plenum chamber 23 into the plenum chamber 22 but not in the opposite direction.

The preceding description of the power train which is shown in FIG. 1 makes it clear that, practically within the entire range when the infinitely variable transmission acts as a step-down transmission (i.e., when the transmission can be said to constitute or operate as an underdrive), the axial force which is generated by the cams or ramps of the cam discs 18 and 19 is taken up only by the axially effective surface which develops in the plenum chamber 22. On the other hand, when the transmission acts as or constitutes an overdrive (i.e., when the transmission can be said to constitute a step-up transmission), the axial force which is furnished by the ramps or cams of the cam discs 18 and 19 and acts upon the disc 19 is counteracted by axially effective surfaces in both plenum chambers. Thus, and if the input torque does not change, the pressure generated by the torque sensor 14 when the transmission acts as a step-down transmission is higher than the pressure which is generated by the torque sensor 14 when the transmission acts as a step-up transmission.

The infinitely variable transmission of FIG. 1 is assumed to be designed in such a way that the switchover point, namely the timing of the establishment of a connection between the plenum chambers 22, 23, or of an interruption of such connection, takes place when the transmission ratio is or approximates one-to-one. However, such switchover point can be readily shifted in either direction, i.e., toward a higher or a lower transmission ratio, by the simple expedient of properly dimensioning and/or positioning the bores 59, 60 of the driving shaft A and/or the centering portions 63, 64 which are provided on the axially movable flange 1a and control the flow of hydraulic fluid through the respective bores. The term "switchover point" is not intended to always cover a single accurately determined axial position of the flange 1a but can also embrace a reasonable range of such axial positions.

It is also possible to provide a special valve for the purpose of establishing and terminating a connection between the plenum chambers 22 and 23. To this end, the torque sensor 14 can be provided with a channel which establishes a path for the flow of hydraulic fluid between the plenum chambers 22, 23 and the valve can be installed in such conduit. The valve need not be actuated directly by the axially movable flange 1a or 2a but can receive signals for actuation from an externally located energy source. For example, the valve can constitute a hydraulically or pneumatically actuated or an electromagnetic valve which is actuated in dependency upon the transmission ratio or upon a change of the transmission ratio of the infinitely variable transmission. Highly satisfactory results can be obtained with a so-called 3/2-way valve which is installed to permit or to interrupt the flow of hydraulic fluid between the plenum chambers 22 and 23. The 3/2-way valve or another suitable valve could be installed in a conduit connecting the channels 35 and 58 of the driving shaft A. This would render it possible to seal or to dispense with the bores 59 and 60 of the shaft A. The valve would have to be designed and installed in such a way that it would permit fluid to flow from the plenum chamber 23 when the plenum chambers 22 and 23 are sealed from each other. All that is necessary is to provide a connection for the flow of fluid from the plenum chamber 23 to the sump in response to appropriate setting of the valve, i.e., when the latter seals the plenum chambers 22, 23 from each other.

If the flow of fluid between the plenum chambers 22, 23 and from the plenum chamber 23 to the sump or the like is controlled by a valve which can be regulated from the outside (e.g., electromagnetically), it is possible to change the setting of such valve in response to changes in one or more additional parameters. For example, the valve can be actuated in response to detection of abrupt changes (peaks) of torque being transmitted by the power train. This eliminates, or at least reduces, the likelihood of slip between the chain 3 and the flanges of the pulley 1 and/or 2, at least within certain ranges of operation, e.g., within certain ranges of the ratio of the infinitely variable transmission. FIG. 1 shows that the torque sensor 14 is installed between the prime mover and the axially movable flange 1a of the pulley 1. However, the torque sensor can be readily adapted or modified for installation at one or more other locations, e.g., on the driven shaft B. For example, a torque sensor similar to or practically identical with the torque sensor of FIG. 1 can be installed adjacent to and downstream of the axially movable flange 2a of the pulley 2 on the driven shaft B. Still further, the power train can employ a plurality of torque sensors, for example, a first torque sensor on the driving shaft A ahead of the axially movable flange 1a (as seen in the direction of power flow) and a second torque sensor on the driven shaft B downstream of the axially movable flange 2a.

It is further possible to combine the torque sensor 14 (or an equivalent torque sensor having at least two plenum chambers) with other facilities which are provided to bring about a torque-dependent and/or a transmission ratio-dependent modulation of fluid pressure. For example, the rolling elements 20 of the illustrated torque sensor 14 could be designed to move radially relative to the adjacent ramps or cam faces of the discs 18, 19 in response to changes of the ratio of the infinitely variable transmission, e.g., in a manner disclosed in the published German patent application Serial. No. 42 34 294.

FIG. 1 shows that the cylinder chamber 6 of the adjusting unit 5 for the flange 2a is connected with the torque sensor 14. However, it is also possible to connect the torque sensor 14 with the cylinder chamber 13 in the adjusting unit 11, i.e., to ensure that the pressure of hydraulic fluid in the cylinder chamber 13 is determined by the torque sensor. The unit 5 including the cylinder chamber 6 then forms part of the means for changing the ratio of the infinitely variable transmission. All that is necessary in order to carry out the just outlined modifications of the transmission is to switch the connections for the conduits 37 and 52.

It is presently preferred to mass-produce several component parts of the torque sensor 14 from a suitable metallic sheet material. This also applies for the cam discs 18 and 19; such parts can be produced in a suitable stamping or embossing machine.

Figure 2:
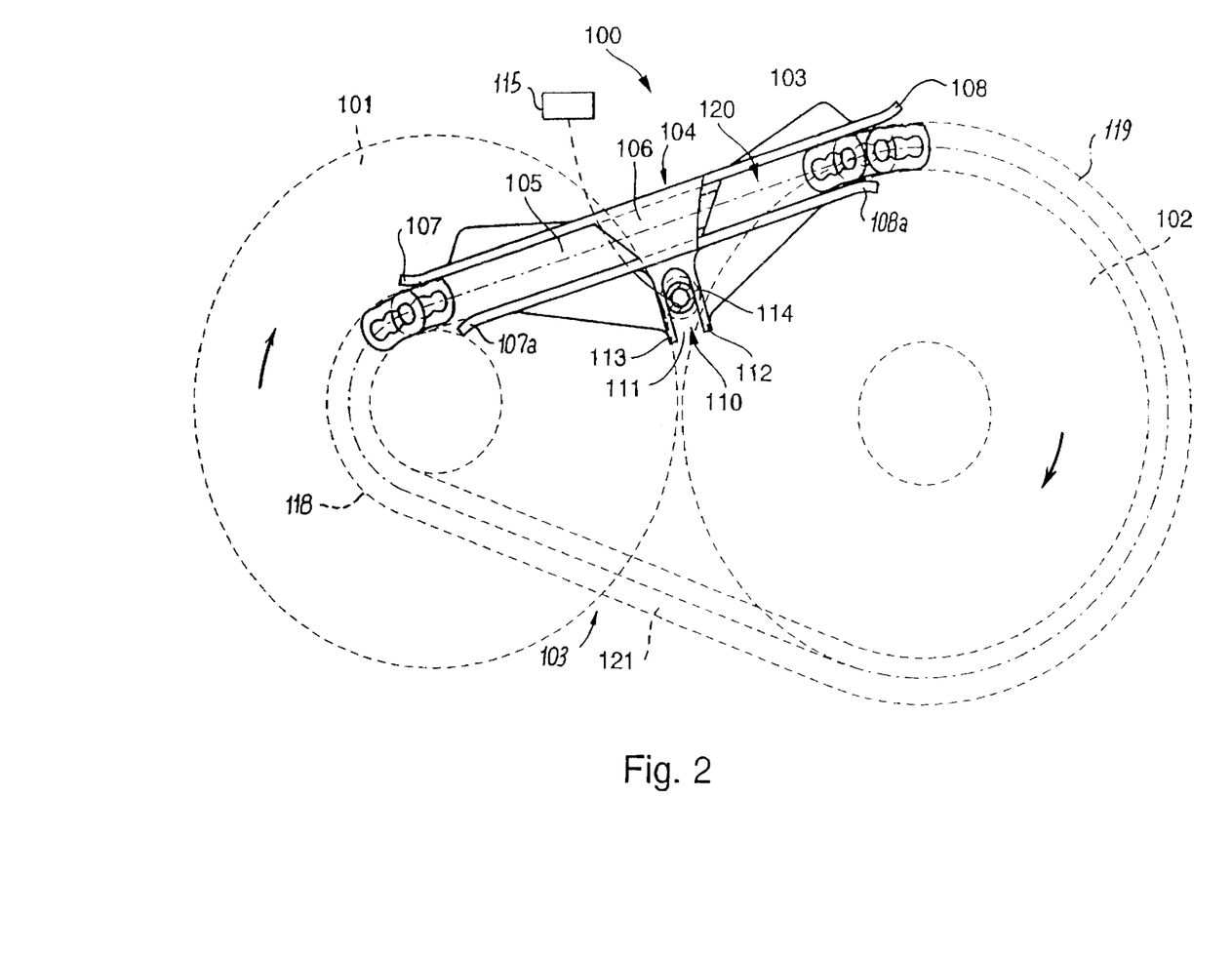
FIG. 2 is an enlarged partly schematic side elevational view of a transmission wherein one elongated stretch or reach of an endless chain is associated with a guide which is constructed and mounted in the transmission in accordance with a first embodiment of the present invention.

FIG. 2 shows a portion of a continuously variable transmission (CVT) 100 which embodies one form of the present invention. This transmission comprises a first rotary member 101 (such member can constitute a gear, a wheel or an adjustable pulley corresponding to the pulley 1 of the transmission shown in FIG. 1), a second rotary member 102 which can constitute a gear, a wheel or an adjustable pulley corresponding to the pulley 2 shown in FIG. 1 and being rotatable about an axis parallel to the axis of the rotary member 101, and an endless flexible element 103, e.g., a chain of the type disclosed, for example, in U.S. Pat. No. 5,728,021 (granted Mar. 17, 1998 to van Rooij et al. for "TRANSMISSION CHAIN FOR A CONE PULLEY TRANSMISSION"), in U.S. Pat. No. 5,427,583 (granted Jun. 27, 1995 to Wolf for "LOW-NOISE, TRIPLE SIDE BAR SPROCKET CHAIN FOR INFINITELY VARIABLE TRANSMISSION"), in U.S. Pat. No. 4,927,404 (granted May 22, 1990 to Rattunde for "LINK CHAIN FOR AN INFINITELY VARIABLE CONE DRIVE DISK TRANSMISSION") or in U.S. Pat. No. 4,344,761 (granted Aug. 17, 1982 to Steuer for "SIDE-BAR CHAIN FOR CONE PULLEY TRANSMISSIONS").

The chain 103 comprises a first arcuate portion 118 trained over the rotary member 101 (hereinafter called pulley), a second arcuate portion 119 trained over the rotary member 102 (hereinafter called pulley), a first elongated stretch or reach 120 which extends between one end of the arcuate portion 118 and one end of the arcuate portion 119, and a second elongated stretch or reach 121 which extends between the other end of the arcuate portion 119 and the other end of the arcuate portion 118.

Let it be assumed that the pulley 101 is rotated (e.g., by the combustion engine, not shown, of a motor vehicle) in a clockwise direction, i.e., that the stretch 120 of the chain 103 is a so-called thrust stretch and that the stretch 121 is acted upon by a stretching force. The situation is reversed if the pulley 101 is driven in a counterclockwise direction, either by the pulley 102 and the chain 103 or directly by the prime mover.

In accordance with the invention, the transmission 100 further comprises an elongated guide 104 which at least partially surrounds the stretch 120, i.e., that length of the chain 103 which, when the pulley 101 is driven, extends from the upper end of the arcuate portion 118 to the upper end of the arcuate portion 119. It is to be noted that, when the transmission 100 is in actual use (i.e., when the pulley 101 is driven to rotate in a clockwise direction, as viewed in FIG. 2), successive links or analogous components of the chain 103 continuously leave the arcuate portion 118 to become part of the stretch 120, successive links continuously leave the stretch 120 to become part of the arcuate portion 119, and so forth. The situation is reversed when the pulley 101 is driven to rotate in a counterclockwise direction.

If the ratio of the transmission 100 is constant, e.g., if the rotary members 101, 102 are simple (non-adjustable) pulleys or gears, the radii of curvature of the arcuate portions 118 and 119 remain unchanged. On the other hand, and as will be described with reference to FIG. 3, the angle enclosed by the stretches 120, 121 varies continuously during a change of the ratio of the transmission, namely when the radius of curvature of the arcuate portion 118 increases from the smallest radius of curvature shown in FIG. 2 while, at the same time, the radius of curvature of the arcuate portion 119 decreases from the maximum value shown in FIG. 2.

If the ratio of the transmission 100 is variable, i.e., if the orientation of that stretch (120 in FIG. 2) which is combined or associated with the guide 104 is expected to change in actual use (or prior to actual use) of the transmission, the latter preferably further comprises a support or holder 110 and means (114) for movably mounting the support so that the latter can share one or more types of movement of the stretch 120. The illustrated mounting means 114 comprises a tubular member which is installed in a frame or housing (such as the housing 30 shown in FIG. 1) for the transmission 100 at that side of the stretch 120 which faces toward the shafts for the pulleys 101, 102. Otherwise stated, the support 110 is installed in the space between the adjacent portions of the pulleys 101, 102. This ensures that the guide 104 need not occupy any space at the outside of the chain 103.

It is clear that the transmission 100 can be equipped with two (identical or different) guides, one for each of the stretches 120 and 121. If provided, the guide for the stretch 121 can be mounted in the same way as the guide 104, i.e., for pivotal movement about an axis which is parallel to the axis of the tubular member 114 and to the rotational axes of the pulleys 101 and 102.

The configuration of the guide 104 is preferably such that at least a portion or section thereof surrounds the adjacent portion or portions of the elongated stretch 120. To this end, the guide 104 is provided with an elongated channel 105 which is defined by a tunnel-shaped or frame-like central or median section 106 of the guide and surrounds successive increments of the stretch 120 when the chain 103 is driven to advance from the pulley 101 toward the pulley 102 or vice versa.

Figure 4A:
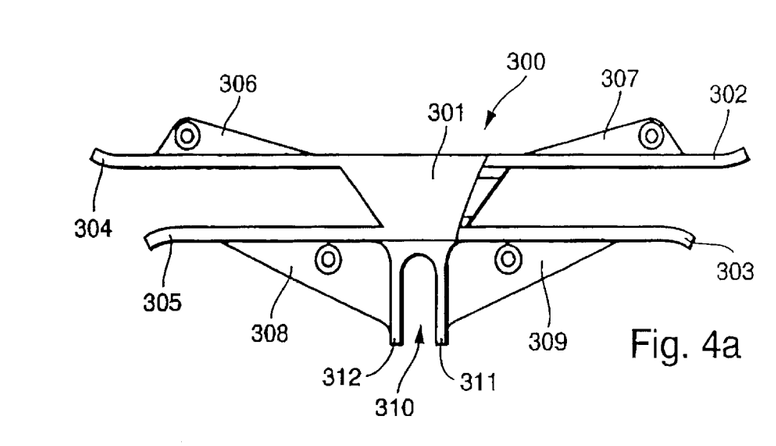
FIG. 4a is a side elevational view of another guide.
Figure 4B:
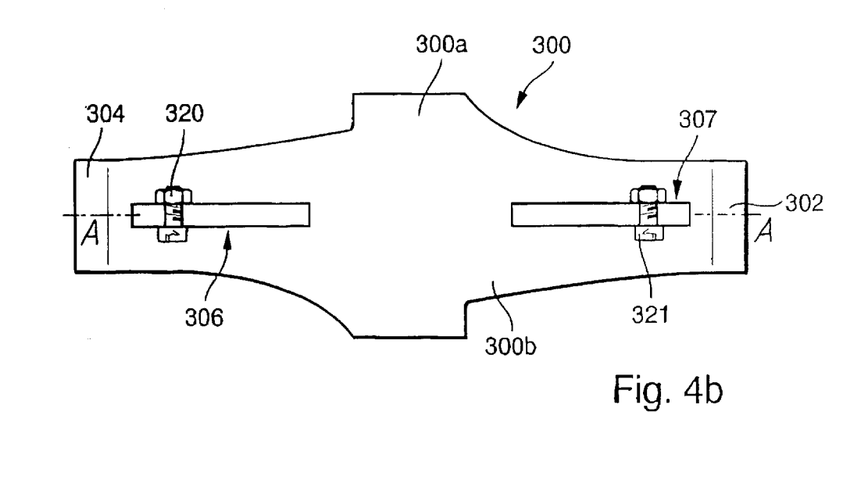
Figure 4C:
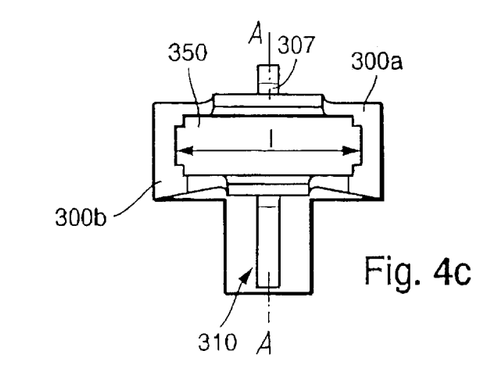
FIG. 4c is an end elevational view of the guide which is depicted in FIGS. 4a and 4b.
Figure 4D:
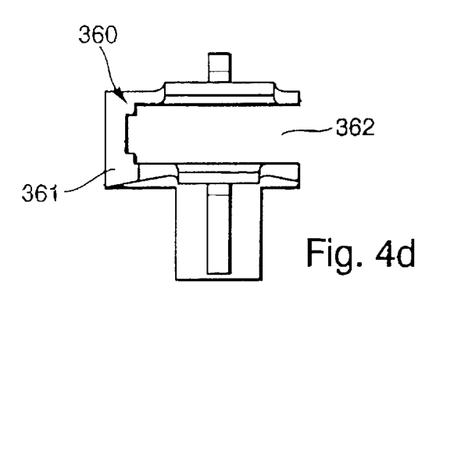
FIG. 4d is an end elevational view of a guide which constitutes a modification of the guide shown in FIGS. 4a, 4b and 4c.

It is equally within the purview of the invention to replace the frame-like or tunnel-shaped central section 106 (i.e., a section having a circumferentially complete cross-sectional outline) with a section having a U-shaped cross-sectional outline (this can be seen in FIG. 4d). An advantage of a U-shaped or a similar cross-sectional outline is that the stretch 120 is always accessible, i.e., that the chain 103 can be detached from the pulleys 101, 102 while the position of the support 110 remains unchanged. Of course, it is further necessary to ensure that all other constituents of the guide 104 and its support 110 also permit unimpeded separation of the chain 103 from the pulleys 101 and 102.

The guide 104 of FIG. 2 further comprises elongated projections 107, 107a and 108, 108a which extend from the respective ends of the central section 106 in the longitudinal direction of the elongated stretch 120. The illustrated projections 107–108a are elongated strips or tongues which define the respective end portions of the path for the links or analogous component parts of the stretch 120. As shown in FIG. 2, the outwardly curved free ends of the projections 107, 107a extend close or all the way to the hub of the axially fixed flange of the pulley 101, and the similarly (i.e., outwardly) curved free ends of the projections 108, 108a extend to the periphery of the pulley 102 when the ratio of the transmission 100 is set (as shown in FIG. 2) to constitute a step-down ratio, i.e., the driving pulley 101 must complete several revolutions before the driven pulley 102 completes a single revolution.

At least some of the projections (e.g., the projections 107a, 108a which are adjacent the inner side of the stretch 120) can be resilient and can be stressed in response to insertion of the stretch 120 into the channel 105 so that the thus stressed projections 107a, 108a bias the adjacent links of the stretch 120 of the chain 103 against the respective projections 107, 108 at the outer side of the stretch 120. The pairs of projections 107, 107a and 108, 108a can be said to define two additional passages or channels constituting extensions of the adjacent ends of the channel or tunnel 105 defined by the central section 106 of the guide 104.

The widths of the clearances between the internal surface of the central section 106 and the inner sides of the projections 107, 107a, 108, 108a on the one hand, and the adjacent links of the stretch 120 of the chain 103 on the other hand, are selected with a view to ensure that the guide 104 cannot impede lengthwise movements of the stretch 120 but that the guide adequately limits stray (particularly lateral) movements of the stretch 120. This ensures that such stretch cannot oscillate or vibrate to an extent which would cause the generation of noise and/or excessive wear upon the guide 104 and/or upon other parts of the transmission. The arrangement is preferably such that the clearances between the parts of the guide 104 and the links of the chain 103 prevent the development of characteristic vibrations or oscillations of the first, second, third, etc. order. This enhances the acoustics of the entire transmission 100, of the power train employing such transmission, and of the motor vehicle utilizing such power train.

The projections 107, 107a and 108, 108a and the central section 105 of the guide 104 cooperate with the adjacent links of the stretch 120 to limit the width and/or the height of the path for this stretch in order to achieve the aforementioned advantages including the suppression of at least some noise (with attendant increase of comfort to the occupant(s) of the motor vehicle), no additional space requirements, relatively low cost and convenient installation or removal of the chain 103.

The support 110 cooperates with the mounting means 114 to ensure that the guide 104 can share the changes of inclination of the stretch 120 relative to the stretch 121 if the ratio of the transmission 100 is variable, e.g., in a manner as already described with reference to the transmission including the adjustable pulleys 1, 2 and the chain 3 of FIG. 1. In fact, it is possible and often desirable to mount the guide 104 in a manner to ensure that the guide can share even certain longitudinal movements of stretch 120 toward the arcuate portion 119 and/or 118 of the chain 103. All that is necessary is to select a proper connection between the guide 104 and the mounting means 114 or the housing for such mounting means.

Furthermore, the nature of the junction between the mounting means 114 and the central section 106 of the guide 104 is such that the section 106 can move toward and away from the stretch 121. The aforedescribed feature that the guide 104 can pivot with the stretch 120 and/or move to a certain extent longitudinally of the stretch 120 and/or move within limits toward and away from the strech 121 is particularly desirable and advantageous if the ratio of the transmission 100 is variable. Thus, once the positions of the stretch 120 and the guide 104 relative to each other are established (optimized), such positions can remain at least substantially unchanged irrespective of changes in the position (such as inclination) of the stretch 120 relative to the stretch 121 and/or relative to the pulleys 101 and 102. It is often sufficient to mount the guide 104 in such a way that the guide can change its orientation with that of the stretch 120 as well as that the guide can move (relative to the mounting means 114) toward and away from the stretch 121.

The support 110 has a socket 111 (flanked by two legs 112, 113 serving to slide along the hollow cylindrical pintle or shaft constituting or forming part of the mounting means 114. Such arrangement enables the support 110 to pivot about the axis of the hollow shaft 114 as well as to move its central section 106 toward and away from the stretch 121. The slot 111 can be an open slot (as actually shown in FIG. 2) or a closed slot (i.e., the legs 112, 113 can be replaced with a circumferentially complete eyelet.

The hollow tubular member 114 (this member can be provided with a cylindrical external surface which is contacted by the support 110) can serve to convey a flow of fluid (such as oil or another suitable lubricant) from a source (schematically shown at 115) to one or more consumers, e.g., from the axially fixed to the axially movable flange of the pulley 101 and/or 102, to the links of the chain 103, to the loci of contact between the mounting member 114 and the support 110 and/or elsewhere in the transmission 100 and/or in the power train employing such transmission.

Figure 3:
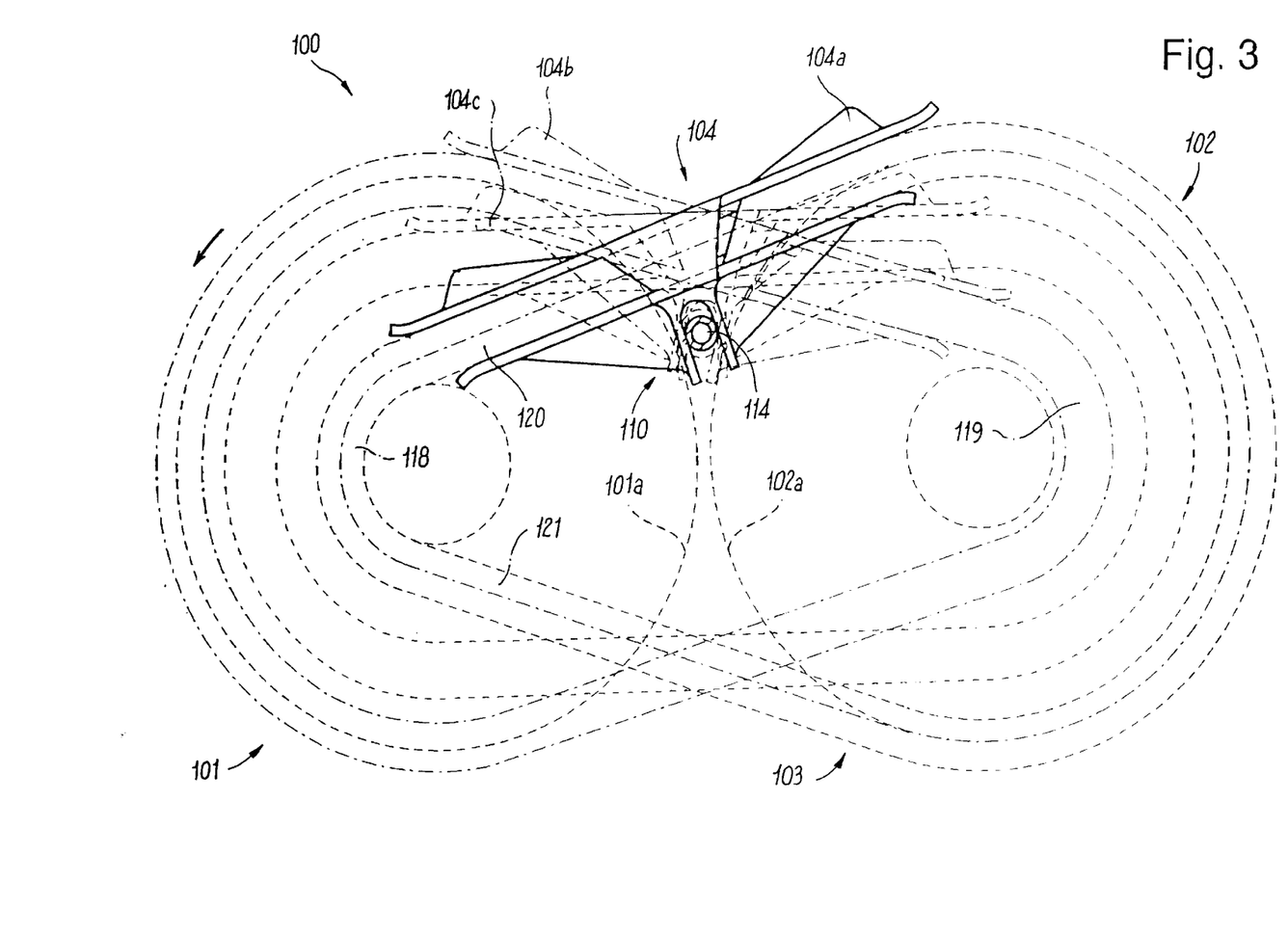
FIG. 3 is a similar partly schematic side elevational view of a transmission wherein an elongated guide for one stretch or reach of the endless flexible element is shown in a number of different angular positions relative to its holder or support.

FIG. 3 shows the guide 104 of the transmission 100 in three different angular positions 104a, 104b and 104c and at three different distances from the stretch 121 of the endless chain 103. The pulley 101 is assumed to be driven in a counterclockwise direction (as indicated by the arrow) and, therefore, the upper stretch 120 of the chain 103 is under tension and transmits torque (also counterclockwise) to the pulley 102. The lower stretch 121 is acted upon by a force which tends to reduce its length.

The ratio of the transmission 100 assumes a first value when the guide 104 dwells in the angular position 104a; at such time, the ratio is a step-down ratio (underdrive), i.e., the pulley 101 must complete more than one revolution before the pulley 102 completes one full revolution. The ratio is, or is close to, one-to-one when the guide 104 assumes the angular position 104c; at such time, the pulley 102 completes one full revolution in response to completion of one full revolution by the pulley 101. On the other hand, the ratio of the transmission 100 is a step-up ratio (overdrive) when the guide 104 assumes the angular position 104b because, at that time, each single revolution of the pulley 101 causes the pulley 102 to complete more than a single revolution, e.g., several revolutions.

FIG. 3 further shows that (the same as in FIG. 2) the shaft 114 for the support 110 of the guide 104 can be placed close to the locus where the peripheral surfaces 110a, 102a of the respective pulleys 101, 102 are nearest to each other.

FIGS. 4a, 4b and 4c illustrate a modified elongated guide 300 having a trough-shaped central portion or section 301 and two outer sections which flank the central section 301. The left-hand outer section includes two spaced-apart projections 304, 305 in the form of tongues or strips having outwardly flaring free end portions, and the right-hand outer section has two projections in the form of strips or tongues 302, 303 which are or which can be mirror images of the projections 304, 305. The guide 300 further includes two substantially wedge-shaped stiffening portions 308, 309 which are of one piece with the adjacent legs 312, 311 of the support 310. The outwardly flaring end portions of the projections 302, 303, 304, 305 constitute a desirable but optional feature of the guide 300; such end portions facilitate the introduction of a length of chain into the channel or tunnel which is defined by the guide.

The guide 300 is assembled of two substantially shell-shaped parts or halves 300a, 300b which are or which can be mirror images of each other with reference to a plane A—A shown in FIGS. 4b and 4c. The means for securing the parts 300a, 300b to each other includes two connectors 306, 307 having suitable threaded fasteners (such as bolts and nuts) 320, 321. Of course, the parts 300a, 300b can be welded or glued or otherwise bonded to each other in addition to or in lieu of the connectors 306, 307.

The reference character 350 denotes in FIG. 4c a tunnel or passage which is defined at least by the central section 301 of the guide 300 (or by the entire guide) and serves to ensure adequate guidance of the corresponding stretch of the endless chain which is utilized in conjunction with one or two guides of the type shown in FIGS. 4a to 4c.

The width 1 of the tunnel or channel 350 which is shown in FIG. 4c at least approximates but can slightly exceed the width of the chain (not shown). Such chain can be constructed in a manner as disclosed, for example, in the aforementioned U.S. Pat. Nos. 5,728,021, 5,427,583, 4,927,404 and 4,344,761.

The depth of the tunnel or channel 350 can exceed, and preferably exceeds, the thickness of the chain (as measured vertically in FIG. 4c) if the ratio of the transmission employing the guide 300 is variable (see FIG. 3). This is particularly desirable when the width 1 of the tunnel or channel 350 practically equals the width of the chain which is utilized in conjunction with the guide 300.

If the width 1 of the tunnel or channel 350 appreciably exceeds the width of the respective chain, the guide 300 may but need not always be movable toward and away from the other stretch of the chain (i.e., toward and away from the stretch 121 if the guide 300 replaces the guide 104 of FIG. 3) when the transmission (such as 100 but employing the guide 300) is caused to change its ratio.

An advantage of a guide (300) which is assembled of several sections or parts (such as 300a, 300b) is that the transmission can be fully assembled before the composite guide is installed to control the orientation of the respective stretch or reach of the chain in such transmission. In addition, a multiple-section guide can be mounted on a selected stretch of the chain in a transmission which, up to such time, was not equipped with a guide.

It is also possible to install a one-piece guide on the chain of an existing transmission; all that is necessary is to open the chain between two selected links and to thread one free end of such chain through the tunnel or passage or channel of the one-piece guide.

FIG. 4d shows a portion of a guide 360 having a substantially U-shaped cross-sectional outline. Thus, this guide defines a channel 362 which is adjacent a web 361 extending longitudinally of the guide, and the open side of the channel 362 can be utilized for convenient introduction of one stretch of an endless chain or another suitable endless flexible element. The guide 360 of FIG. 4d is or can constitute a one-piece body, e.g., a casting, an injection molded part or the like.

Figure 5:
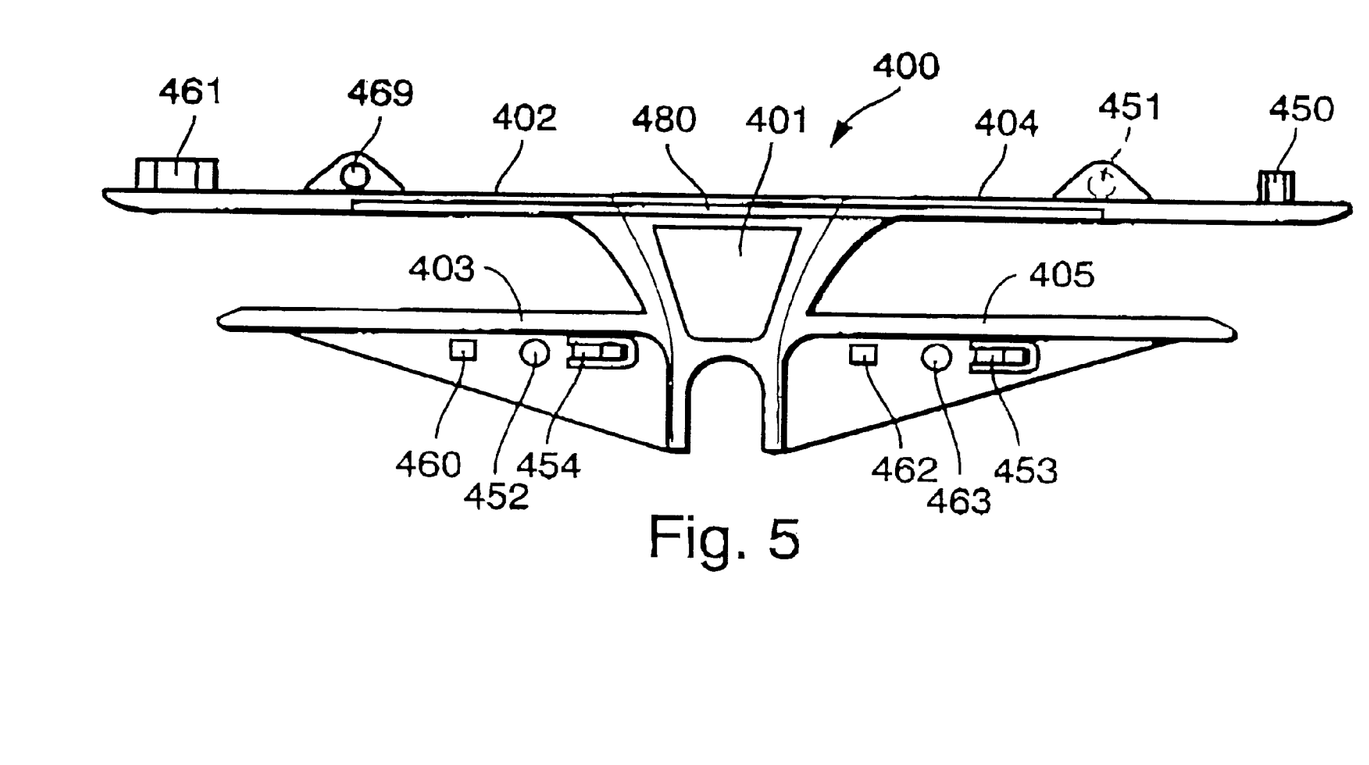
FIG. 5 is an elevational view of a guide which constitutes another modification of the guide shown in FIGS. 4–4c.
Figure 5A:
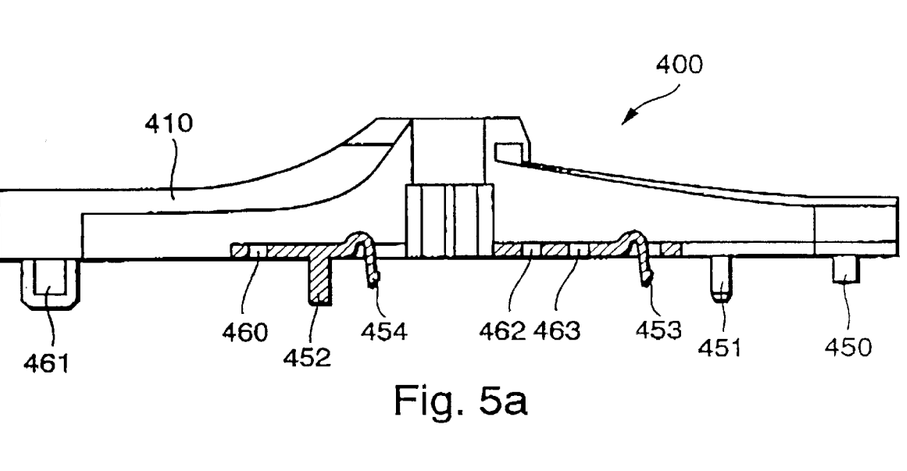
FIG. 5a is another view of the guide which is shown in FIG. 5, with certain parts shown in section.
Figure 5B:
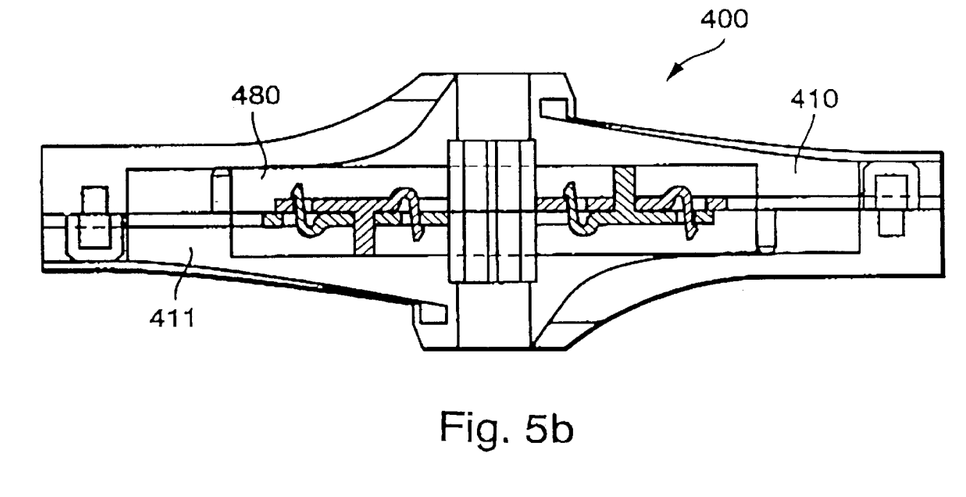
FIG. 5b is a further view of the guide which is shown in FIGS. 5 and 5a, with certain parts again broken away.

FIGS. 5, 5a and 5b illustrate certain relevant details of a further guide 400, e.g., a guide which constitutes an elongated rail having two elongated sections or parts 410, 411 which are (or which can be) mirror images of each other. The guide 400 comprises a central or main portion or section 401, a first end section including projections (such as tongues) 402, 403, and a second end section including projections (such as tongues) 404, 405. The sections 410, 411 are separably coupled to each other in any one of a number of different suitable ways.

At least one of the sections 410, 411 is provided with one but preferably two or more male coupling elements 450 in the form of hooks receivable in the openings of complementary female coupling elements 461. FIGS. 5, 5a and 5b show one male coupling element 450 and one female coupling element 461 on each of the two sections 410 and 411.

Furthermore, each of the sections 410, 411 is provided with at least one male centering member 451 which is received in a complementary female centering member 469 of the other section. The coupling elements 450, 461 are disposed at the ends, and the centering members 451, 469 are provided at the median or central portions, of the respective sections 410, 411. The male elements and members 450, 451 can enter the respective female elements and members 461, 469 by snap action and/or in any other suitable manner, as long as the respective connections are separable (provided that such separability is deemed desirable or necessary).

FIGS. 5 and 5a further show hook- or barb-shaped male fasteners 453, 454 of the section 410; such fasteners can penetrate into complementary female fasteners 460, 462 of the other section to provide form-locking coupling and/or centering connections in addition to or in lieu of the aforementioned securing and/or centering means.

Additional male centering members 452 and complementary female centering members 463 are provided in the plate-like stiffening elements for the projections 403, 405 close to the central section 401 of the composite guide 400.

The sections or parts 410, 411 of the guide 400 (and/or at least some sections of certain other guides and/or the entire one-piece guides) for use in the transmission of the present invention can be made of a suitable plastic material, such as a thermoplastic or a thermosetting substance. Certain presently preferred plastic materials include epoxy resins, polyamide, polyethylene, polypropylene, polyvinyl chloride, polyether ketone, polyester ether ketone, polybutylene therephthalate, polycarbonate, polystyrene, polyurethane, polypropylene sulfide, polyether sulphone, polyoxymethylene, styrene and the copolymerisates of such substances.

At least some of the above enumerated plastic substances can be reinforced in any convenient or suitable or economical way. For example, one can resort to glass fibers and/or to carbon filaments. In addition, or instead of such expedient or expedients, one can resort to one or more metallic plate-like and/or otherwise configurated inserts (one shown in FIG. 5b, as at 480) to reinforce (such as stiffen) at least one or each part or section of the improved guide. The reinforcing insert(s) can be made of steel or another suitable metallic or other material which exhibits the required characteristics.

The improved transmission and/or the novel guide is susceptible of numerous additional modifications. For example, the projections (such as 107, 107a or 108, 108a) can be provided only at one side of the central section (106). Alternatively, the projections (such as 107a, 108a or 107, 108) at the inner or at the outer side of the respective stretch (120 in FIGS. 2 and 3) of the chain (103) can be omitted.

It is also possible to assemble the improved guide of three or more discrete parts, e.g., on the ground that several parts of a composite guide are subject to wear to different degrees. This renders it possible to achieve savings in more expensive highly wear-resistant material and/or to more frequently replace only that section or those sections of a composite guide which is (or which are) subject to more pronounced wear. If the guide is a composite rail, frame or a like part, it is normally (or often) desirable to employ coupling or fastening means (such as those shown in FIGS. 5, 5*a* and 5*b*) which permit (if and when necessary) repeated dismantling and repeated reassembly of the improved guide or guides.

The distance between a stretch (such as the stretch 120 shown in FIGS. 2 and 3) of the chain (such as 103) and two or more different sections of the improved guide (such as 104.) need not be the same. Thus, the distance between the central section 106 of the guide 104 and the adjacent links of the chain 103 can exceed or can be less than the clearances between the projections 107, 107*a* and/or 108, 108*a* and the respective adjacent portions of such chain.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transmissions and, therefore, such adaptations should and are intended to be comprehended within the meaning and range of equivalence of the appended claims.

What is claimed is:

1. A transmission comprising:
   a first rotary member and a second rotary member, wherein said rotary members include pulleys rotatable about at least substantially parallel axes;
   an endless flexible torque transmitting element having first and second portions respectively trained over said first and second rotary members, and first and second elongated stretches each extending between said first and second portion; and
   an elongated guide for at least one of said stretches, a transmission housing, and a mounting means that is fixedly connected to the transmission housing and movably supports the elongated guide, allowing the latter a range of mobility; wherein the mounting means is arranged at a location that is offset to a side of an imaginary connecting line between said substantially parallel axes, and wherein the range of mobility comprises a limited range of rotation of the elongated guide relative to the mounting means, a limited range of translatory movement of the elongated guide perpendicular to the at least one of said stretches, and a positive constraint against movement of the elongated guide along the at least one of said stretches.

2. The transmission of claim 1, wherein each of said pulleys includes a first flange and a second flange rotatable with and movable axially toward and away from the respective first flange.

3. The transmission of claim 2, wherein at least one flange of each of said pulleys has a conical surface confronting the other flange of the respective pulley, each of said first and second portions of said endless flexible element contacting the conical surface of the at least one flange of the respective pulley.

4. The transmission of claim 1, wherein said guide includes means for limiting said at least one stretch to movements along at least one of a plurality of predetermined paths each extending between said first and second portions of said endless flexible element.

5. The transmission of claim 4, wherein said limiting means defines a channel for at least a portion of said at least one stretch.

6. The transmission of claim 1, further comprising a support and means for movably mounting said guide on said support.

7. The transmission of claim 6, wherein said mounting means defines a pivot axis for said guide.

8. The transmission of claim 7, wherein said first and second members include pulleys respectively rotatable about first and second axes at least substantially parallel to said pivot axis.

9. The transmission of claim 6, wherein said mounting means is arranged to establish at least one path for lengthwise movements of said elongated guide therealong.

10. The transmission of claim 1, wherein said rotary members are spaced apart from each other and said guide is disposed between said rotary members.

11. The transmission of claim 1, wherein said guide includes a frame at least partially surrounding said at least one stretch.

12. The transmission of claim 1, wherein at least a portion of said guide has an at least substantially U-shaped cross-sectional outline and defines a channel receiving at least a portion of said at least one stretch.

13. The transmission of claim 1, wherein at least one of said rotary members is rotatable about a predetermined axis and said guide at least partially surrounds said at least one stretch with freedom of movement of said at least one stretch substantially radially of said axis.

14. The transmission of claim 1, wherein said guide includes at least one projection extending at least substantially lengthwise of said at least one stretch.

15. The transmission of claim 1, wherein said guide includes a central portion at least partially surrounding a median portion of said at least one stretch, and first and second projections flanking said central portion and respectively extending lengthwise of said at least one stretch toward said first and second rotary members.

16. The transmission of claim 1, wherein said guide includes at least two projections disposed at opposite sides and extending at least substantially lengthwise of said at least one stretch.

17. The transmission of claim 1, wherein said first and second members are rotatable about parallel axes, said at least one stretch having an inner side confronting said axes and an outer side facing away from said axes, said guide comprising at least one projection extending lengthwise of said at least one stretch at one of said inner and outer sides.

18. The transmission of claim 1, wherein said guide is of one piece.

19. The transmission of claim 1, wherein said guide comprises a plurality of sections and means for securing said sections to each other.

20. The transmission of claim 19, wherein said guide comprises shell-shaped sections.

21. The transmission of claim 19, wherein said securing means includes at least one threaded fastener.

22. The transmission of claim 1, wherein said guide comprises at least two sections which are bonded to each other.

23. The transmission of claim 1, wherein said guide comprises first and second sections and means for securing said first and second sections to each other, said securing means including at least one male coupling element provided on one of said sections and a complementary female, coupling element provided on the other of said sections.

24. The transmission of claim 23, wherein said at least one male coupling element comprises a hook and said complementary female coupling element has an opening for said hook.

25. The transmission of claim 1, wherein said guide comprises at least one first section, at least one second section, and means for centering at least one of said sections relative to the other of said sections.

26. The transmission of claim 1, wherein said at least one stretch has a side confronting said rotary members, and further comprising a support for said guide and means for movably securing said guide to said support at said side of said at least one stretch.

27. The transmission of claim 26, wherein said securing means includes a cylindrical member.

28. The transmission of claim 26, wherein said securing means includes a tubular member.

29. The transmission of claim 26, further comprising a source of fluid, said securing means including a member defining a passage for the flow of fluid from said source.

30. The transmission of claim 1, wherein said at least one stretch has a side confronting said rotary members, and further comprising a holder for said guide, said holder being disposed at said side of said at least one stretch.

31. The transmission of claim 1, wherein said first and second members are rotatable about at least substantially parallel axes and said at least one stretch is movable relative to said first and second members between a plurality of different positions, and further comprising means for movably supporting said guide so that said guide shares at least some movements of said at least one stretch relative to said first and second members.

32. The transmission of claim 1, wherein said elongated guide includes a median section at least partially surrounding a first portion of said at least one stretch with a first play, and second and third sections flanking said median section, said second and third sections at least partially surrounding second and third portions of said at least one stretch with a second play different from said first play.

33. The transmission of claim 1, wherein said guide includes at least one resilient part which is stressed in a direction toward said at least one stretch.

34. The transmission of claim 1, further comprising means for reinforcing at least a portion of said guide.

35. The transmission of claim 1, wherein at least a portion of said guide consists of a plastic material selected from the group consisting of thermoplastic and thermosetting materials.

36. The transmission of claim 1, wherein at least a portion of said guide consists of a material selected from the group consisting of epoxy resins, polyamide, polyethylene, polypropylene, polyvinyl chloride, polyether ketone, polyester ether ketone, polybutylene therephthalate, polycarbonate, polystyrene, polyurethane, polypropylene sulfide, polyether sulphone, polyoxymethylene, styrene and copolymerisates of the above.

37. The transmission of claim 1, wherein at least a portion of said guide consists of a reinforced plastic material.

38. The transmission of claim 37, wherein said plastic material is reinforced by at least one the the materials including glass fibers and carbon filaments.

39. The transmission of claim 1, wherein said guide comprises two sections which are mirror images of each other.

* * * * *